Dec. 18, 1962
L. C. MORTON
3,068,703
PRESSURE GAUGE
Filed Feb. 24, 1958
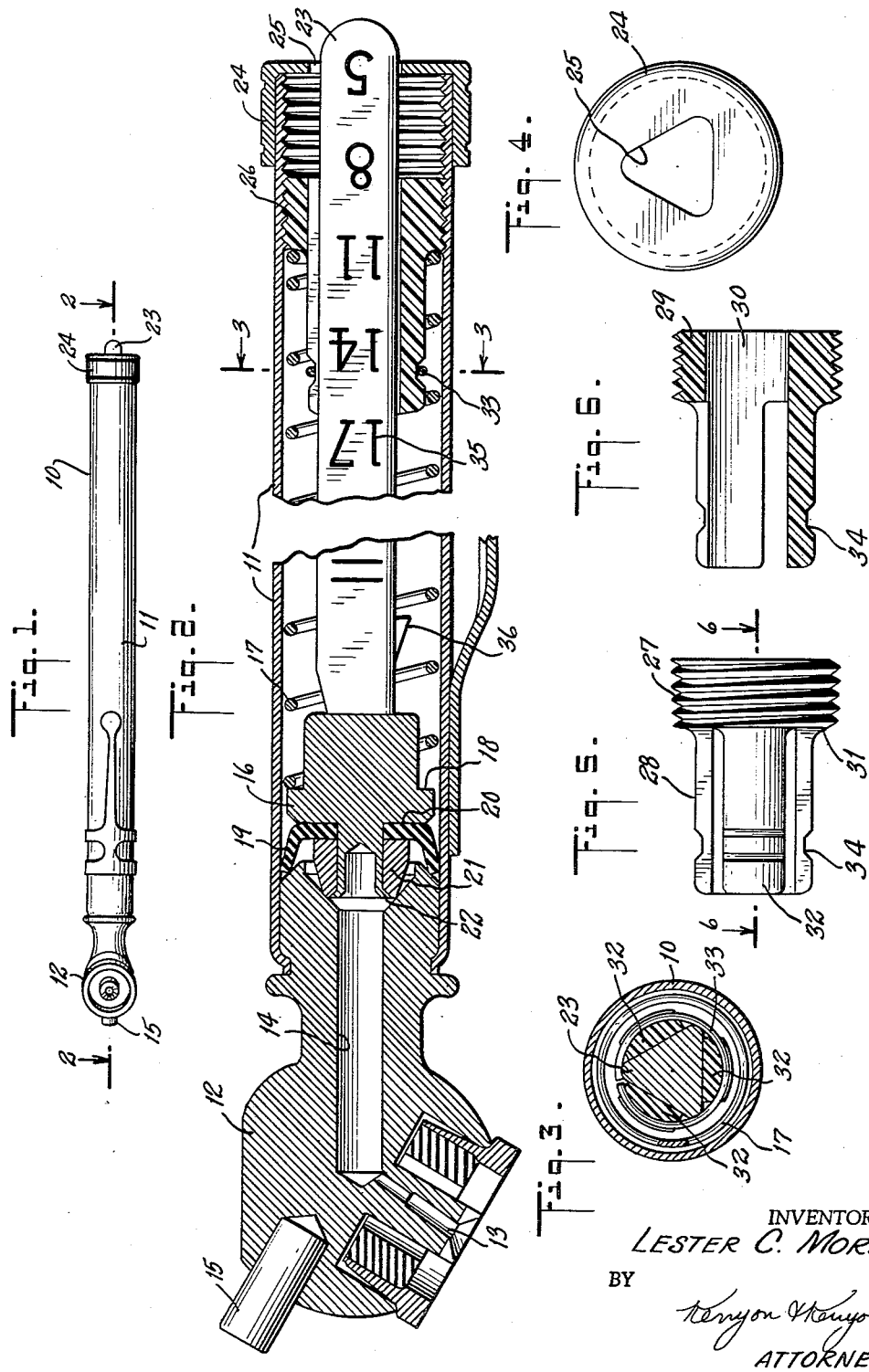
INVENTOR.
LESTER C. MORTON
BY
*Kenyon & Kenyon*
ATTORNEYS United States Patent Office 3,068,703
Patented Dec. 18, 1962

3,068,703
PRESSURE GAUGE
Lester C. Morton, Trumbull, Conn., assignor to National Distillers and Chemical Corporation, a corporation of Virginia
Filed Feb. 24, 1958, Ser. No. 717,086
2 Claims. (Cl. 73—419)

This invention relates to pressure gauges of the type used to ascertain the air pressure in pneumatic tires, and more particularly to an improved pressure gauge with a friction guide to hold the calibrating bar in the position to which it is extended by air pressure.

Pressure gauges presently used to determine the air pressure in pneumatic tires and the like generally all utilize calibrated indicating bars from which the air pressure may be read directly. These indicating bars are generally mounted in a casing and are movable axially therein. The indicating bar is generally spring biased by a spring whose tension is adjustable to extend the bar a given distance from the casing for various increments of pressure.

In many of these prior art pressure gauges there is no provision for maintaining the indicating bar in its extended position after the gauge is disengaged from the source of pressure. This has the disadvantage of necessitating that a reading be taken while the gauge is connected to the source of pressure and often results in inaccurate readings due to the rapidity with which the reading must be made and the angle at which the indicating bar must often be viewed. In many applications pressure gauges of this type cannot be used due to the awkward angle at which the indicating bar must be read, and in many cases the inaccessibility of the indicating bar makes the taking of any reading at all practically impossible.

In order to overcome this disadvantage numerous attempts have been made to incorporate holding means in pressure gauges to maintain the indicator bar in the position to which it has been extended by the fluid pressure. This has the advantage of enabling an accurate reading to be taken after the pressure gauge has been disengaged from the source of pressure. The holding means in presently used pressure gauges are generally in the form of springs or brake shoes which are adapted to bear against the indicator bar and frictionally hold it in its extended position after the source of pressure is removed. Holding means of this type have been found objectionable since they either exert too much pressure on the indicator bar, thereby preventing its extension to a distance commensurate with the applied pressure, resulting in an inaccurate reading, or else exert insufficient pressure on the indicator bar permitting it to return to some extent to its original position, again resulting in an inaccurate reading.

In view of the foregoing it is the primary object of the present invention to provide an improved pressure gauge in which the indicator bar is maintained in the position to which it was extended by the fluid pressure, but which does not retard in any manner the free movement of the indicator bar such as to result in an inaccurate reading.

For a better understanding of the present invention as well as further objects and features thereof, reference is made to the following detailed description to be read in conjunction with the accompanying drawings wherein like components in the several views are identified by like reference numerals.

In the drawings,

FIGURE 1 is a front elevation of a pressure gauge empobdying the features of the present invention.

FIGURE 2 is a sectional elevation taken on line 2—2 of FIGURE 1, the parts being shown on an enlarged scale to illustrate structural details.

FIGURE 3 is a cross-section taken along line 3—3 of FIGURE 2.

FIGURE 4 is an end elevation of the pressure gauge of the present invention looking at the right end of FIGURE 2.

FIGURE 5 is a side elevation of the friction guide of the present invention and

FIGURE 6 is a cross-section taken along line 6—6 of FIGURE 5.

Referring now to the drawings the pressure gauge of the present invention is generally denoted by the numeral 10 and includes an elongated tubular casing 11. The casing 11 is closed at one end by an air chuck 12, which is secured to or formed integrally with the casing 11. The air chuck 12 illustrated is of the press-on type and has an inflating pin 13 which permits the entrance and exit of fluid from the gauge 10. The inflating pin 13 is in free fluid communication with the casing 11 through port 14. If desired, the chuck 12 may be provided with an outwardly extending deflating pin 15.

A plunger 16 is located within the casing 11 and when the gauge 10 is inoperative it rests against the inner end of the air chuck 12. The plunger 16 is movable axially within the casing 11 and is stressed to its seat against the chuck 12 by return spring 17 which bears against annular shoulder 18 of the plunger 16. An annular bucket 19 is disposed within the casing 11 in such manner as to be in contact with the inner surface of the wall of the casing 11 and with the outer surface of the plunger 16. This bucket is made of flexible material and its purpose is to prevent leakage of fluid, such as compressed air, past the plunger 16. The bucket 19 bears against shoulder 20 of plunger 16 and is held in position by washer 21. The inner end of the plunger 16 is flared such as at 22 to engage the washer 21 such that it bears against bucket 19 and maintains the bucket in engagement with shoulder 20 of plunger 16. It can, therefore, be seen that plunger 16, bucket 19 and washer 21 move axially within casing 11 as one unit against the force of spring 17 due to fluid flowing under pressure through port 14 into casing 11. The bucket 19 prevents the leakage of any fluid and therefore the entire force of any liquid entering the casing 10 is expended in moving the plunger 16 axially in casing 11.

An indicating bar 23 extends axially within the casing 11 and through the open end of the casing 11 opposite the end having the chuck 12. This indicating bar is graduated to register the relative pressure of the fluid entering the casing 11 through port 14. One end of the bar 23 rests against the plunger 16, but is not secured thereto, thereby permitting the plunger 16 to return to the position seen in FIGURE 1 after an impulse of pressure fluid flowing through port 14, while leaving the bar 23 extending from the casing 11. The bar 23 may be of various cross-sections, such as triangular, rectangular, or otherwise polygonal.

A cap 24 is mounted on the open end of the casing 11 opposite the chuck 12, and is secured to the casing in any manner, such, for example, as by a force fit. The cap 24 has an opening 25 formed centrally therein corresponding to the cross-section of and slightly greater than the bar 23 in order to permit the bar to extend through the cap and move freely therethrough.

The casing 11 adjacent the end having the cap 24 secured thereto is internally threaded as at 26 with threads complementary to the threads 27 on the friction guide denoted generally by the numeral 28. This friction guide 28 is in the form of a sleeve 29 which is threadedly engaged with the casing 11 and movable axially therein. The sleeve 29 has an opening 30 formed therethrough of approximately the same cross-section as the bar 23, and aligned axially with the opening 25 in the cap 24 when the sleeve 29 is in threaded engagement with the casing 11. The opening 30 in the sleeve 29 is adapted to permit the bar to move therethrough while being in sliding engagement therewith.

The return spring 17 for the plunger 16 seats against the inner face 31 of sleeve 29 when the sleeve is in threaded engagement with the casing 11. The spring 17 resiliently stresses the plunger 16 against the inner end of the air chuck 12 and its tension is adjusted by varying the position of sleeve 29 in the casing 11.

The sleeve 29 has secured thereto or formed integrally therewith a plurality of fingers 32 which are axial extensions of the sleeve 29. These fingers 32 are so arranged and spaced that one finger bears against each side or face of the bar 23. This is best illustrated by reference to FIGURE 3 which illustrates a bar which is triangular in cross-section. With this bar configuration three fingers are utilized, one bearing against each face of the bar 23. This is accomplished by spacing the fingers equidistant from each other and such that they enclose an area which defines a geometric figure having approximately the same cross-section as the bar 23 and the opening 30 in the sleeve 29. As stated previously, the fingers 32 are so disposed as to be in sliding contact with the bar 23 as it moves axially in the casing 11. In order to permit the fingers 32 to maintain a constant pressure on the bar 23 and to prevent them from flexing apart an annular spring wire 33 is positioned adjacent the lower or outer extremities of the fingers in such manner as to encircle the fingers. This spring wire 33 rests in recesses 34 formed in the outer surface of each finger.

It is to be understood that the bar 23 may be made in any desired shape or size and the number of fingers will vary depending on the configuration of the bar 23. If, for example, the bar is four sided such, for example, as square or rectangular, there may be two or four fingers. When two fingers are used, they are preferably arranged to bear against opposite sides of the bar 23. If desired, the fingers may be channeled such that the bar 23 moves in these channels, each finger overlapping somewhat the faces of the bar adjacent the face in contact with the finger.

One of the novel features of this invention is the material from which the sleeves 29 and the integral fingers 32 are formed. The material from which these members are fabricated should be particularly outstanding with respect to toughness, resilience, abrasion resistance, have a high softening temperature, a low and constant coefficient of friction and be resistant to solvents and chemicals. It is desired that the fingers and sleeve maintain the bar in the position to which it is extended while offering a minimum resistance to the free passage of the bar. The material which has been found to have all these characteristics is nylon, the term nylon being used generically to include any long chain polymeric amide which has recurring amide groups as an integral part of the main polymer chain. Nylon has a low and substantially constant coefficient of friction so that no lubrication of the pressure gauge of the present invention is required. The viscosity of a lubricant often changes due to temperature changes or from dust pick-up with the result that the friction force between the bar and the sleeve changes with time and temperature. Conversely, the friction force between the bar and sleeve of the present invention is nearly constant regardless of temperature or age thereby prolonging the life of the pressure gauge and facilitating more accurate readings.

In assembling the pressure gauge of the present invention, the air chuck 12 is secured in position and the assembly consisting of the washer 21, the bucket 19 and the plunger 16 is inserted in the casing 11. The spring 17 is next inserted in the casing 11 with one end bearing against the shoulder 20 of plunger 16. The other end of spring 17 bears against the surface 31 of the sleeve 29 which is screwed into casing 11 to compress the spring 17. As illustrated in FIGURE 2, the sleeve is inserted in the casing 11 with the fingers being inserted first such that they extend in the direction of the chuck 12. If desired, however, the position of the sleeve may be reversed before insertion in the case such that the fingers extend in the direction of the cap 24. With this latter embodiment, the spring 17 bears against the opposite face of the sleeve 29 than that shown in FIGURE 7.

The bar 23 is provided with one or more protrusions or enlargements 36 on one or more sides as illustrated in FIGURE 2. These protrusions 36 are located near the inner or lower end of the bar 23 and serve to prevent the bar from being pulled entirely out of the case 11. In assembling the pressure gauge of the present invention, the bar 23 is first inserted in the sleeve 29 and the sleeve and bar are then inserted in the casing 11. The pressure gauge is then calibrated. This is done by applying the chuck 12 to a known source of fluid pressure. The inflowing fluid through port 14 forces the plunger 16 outward axially along the casing 11 to an extent proportional to the amount of pressure so that the bar 23 moves out and discloses the registered pressure by means of the indicia markings 35 on the bar 23. The source of pressure is then removed and when this is done the spring 17 returns the plunger 16 to the position shown in FIGURE 2 while the sleeve and fingers retain the bar 23 in its extended position. If the pressure registered is greater than the applied pressure, the spring 17 is compressed by screwing the sleeve 29 further in the casing 11, and if the pressure is less the sleeve is moved in the opposite direction thereby relieving pressure on the spring. By varying the tension of the spring 17 the force required to move the plunger and bar can also be varied. In this manner the pressure gauge can be calibrated to compensate for any force that is required to overcome the friction of the fingers and sleeve in the bar. When the pressure gauge is correctly calibrated the cap 24 is secured to the casing 11. Once the cap is secured to the casing no further adjustment of the pressure gauge is possible due to the shape of the opening 25 in the cap 24. After the pressure gauge is used the bar 23 is manually pushed back into the casing 11 to the position shown in FIGURE 2 and it is then ready for use.

What has been described is a pressure gauge which will maintain the indicating bar in the position to which it is extended by the fluid pressure. The sleeve and fingers that maintain the bar in position do not affect the accuracy of the reading due to the nature of the nylon from which these components are made and to the fact that the gauge is calibrated to compensate for any friction forces present.

I claim:

1. A fluid pressure gauge comprising a tubular casing open at one end and having an apertured chuck at the other end selectively to pass fluid under pressure into said casing, pressure responsive means movable axially in said casing, resilient sealing means disposed between said pressure responsive means and said chuck and movable with the pressure responsive means to prevent fluid entering the casing through said chuck from escaping past said pressure responsive means, an indicating bar movable by but not connected to said pressure responsive means and projectable through the open end of said casing, a closure cap for the open end of said casing formed with an opening through which said bar extends, a nylon sleeve in said casing adjacent the open end thereof, said sleeve having an opening corresponding to the cross-sectional form of the indicating bar which extends and is movable therethrough, a spring annularly surrounding but spaced from said indicating bar, said spring being maintained under compression between said sleeve and said pressure responsive means, said sleeve being threadably interconnected with said casing whereby said sleeve is axially movable in said casing to vary the compression of said spring, a plurality of nylon fingers extending axially from said sleeve and frictionally engaging the surfaces of said indicating bar whereby said bar is held in its extended position, and a spring annularly surrounding said fingers at the outer ends thereof whereby said fingers are stressed uniformly into frictional engagement with the surfaces of said bar to maintain said bar in sliding contact with said fingers and in the position to which it is extended by the fluid pressure, the inner surface of each of said axially extending fingers being a plane of relatively large area whereby a large area of contact is provided between said fingers and said indicating bar.

2. A fluid pressure gauge in accordance with claim 1 wherein said indicating bar is triangular in cross-section and said sleeve has three fingers extending axially therefrom, each of said fingers frictionally engaging one of the surfaces of said bar to maintain said bar in the position to which it is extended by the fluid pressure.

References Cited in the file of this patent
UNITED STATES PATENTS

| | | |
|---|---|---|
| 2,049,532 | Williams | Aug. 4, 1936 |
| 2,078,148 | Longstreet | Apr. 20, 1937 |
| 2,096,328 | Iskyan | Oct. 19, 1937 |
| 2,541,790 | Sugden et al. | Feb. 13, 1951 |
| 2,809,130 | Rappaport | Oct. 8, 1957 |
| 2,924,100 | Price | Feb. 9, 1960 |